United States Patent
Hart (10) Patent No.: US 9,494,217 B2
(45) Date of Patent: *Nov. 15, 2016

(54) MULTI-SPEED TRANSMISSION

(71) Applicant: GM Global Technology Operations LLC, Detroit, MI (US)

(72) Inventor: James M. Hart, Belleville, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/640,845

(22) Filed: Mar. 6, 2015

(65) Prior Publication Data

US 2015/0267787 A1    Sep. 24, 2015

Related U.S. Application Data

(60) Provisional application No. 61/968,142, filed on Mar. 20, 2014.

(51) Int. Cl.
*F16H 3/44* (2006.01)
*F16H 3/66* (2006.01)

(52) U.S. Cl.
CPC ............... *F16H 3/663* (2013.01); *F16H 3/66* (2013.01); *F16H 2003/442* (2013.01); *F16H 2200/0069* (2013.01); *F16H 2200/201* (2013.01); *F16H 2200/2012* (2013.01); *F16H 2200/2023* (2013.01); *F16H 2200/2046* (2013.01)

(58) Field of Classification Search
CPC .... F16H 3/663; F16H 3/66; F16H 2200/201; F16H 2033/442; F16H 2200/2023; F16H 2200/0069; F16H 2200/2012; F16H 2200/2046

See application file for complete search history.

(56) References Cited

U.S. PATENT DOCUMENTS

| | | | |
|---|---|---|---|
| 5,049,116 A * | 9/1991 | Asada | F16H 3/663 475/269 |
| 8,197,375 B1 | 6/2012 | Hart | |
| 8,277,355 B2 | 10/2012 | Hart | |
| 8,343,007 B2 | 1/2013 | Hart | |
| 8,353,801 B2 | 1/2013 | Hart | |
| 8,523,729 B2 | 9/2013 | Hart | |
| 8,529,396 B1 * | 9/2013 | Vernon | F16H 3/663 475/277 |
| 8,715,130 B2 | 5/2014 | Mellet | |
| 8,758,185 B2 | 6/2014 | Mellet | |
| 8,894,534 B2 | 11/2014 | Mellet | |
| 9,074,663 B2 | 7/2015 | Mellet | |
| 2008/0234093 A1 * | 9/2008 | Diosi | F16H 3/66 475/276 |
| 2009/0088289 A1 | 4/2009 | Baldwin | |
| 2011/0009229 A1 * | 1/2011 | Bauknecht | F16H 3/66 475/275 |
| 2011/0028262 A1 * | 2/2011 | Yamamoto | F16H 3/666 475/275 |
| 2011/0306461 A1 * | 12/2011 | Aota | F16H 3/666 475/275 |
| 2012/0108382 A1 * | 5/2012 | Saitoh | F16H 3/66 475/276 |
| 2012/0302393 A1 * | 11/2012 | Seo | F16H 3/663 475/276 |
| 2012/0302394 A1 * | 11/2012 | Seo | F16H 3/66 475/276 |
| 2013/0150196 A1 * | 6/2013 | Park | B60K 6/365 475/5 |
| 2014/0357434 A1 | 12/2014 | Lundberg | |

* cited by examiner

*Primary Examiner* — David J Hlavka (57) ABSTRACT

A transmission is provided having an input member, an output member, at least three planetary gear set assemblies, a plurality of coupling members and a plurality of torque transmitting devices. Each of the planetary gear set assemblies include first, second and third members. The torque transmitting devices include clutches and brakes actuatable in combinations of three to establish a plurality of forward gear ratios and at least one reverse gear ratio.

19 Claims, 4 Drawing Sheets

| GEAR STATE | GEAR RATIO | RATIO STEP | 22 | 24 | 26 | 28 | 32 | 30 |
|---|---|---|---|---|---|---|---|---|
| REV | -4.09 | | | X | X | | X | |
| | | -0.84 | | | | | | |
| 1ST | 4.85 | | | X | X | X | | |
| 2ND | 3.40 | 1.43 | X | X | | X | | |
| 3RD | 2.51 | 1.36 | X | X | X | | | |
| 4TH | 1.99 | 1.26 | | X | X | | | X |
| 4TH | 1.99 | | X | X | | | | X |
| 4TH | 1.99 | | | X | | | X | X |
| 4TH | 1.99 | | | X | | X | | X |
| 5TH | 1.48 | 1.35 | X | | X | | | X |
| 6TH | 1.18 | 1.26 | X | | | X | | X |
| 7TH | 1.00 | 1.17 | | | | X | X | X |
| 7TH | 1.00 | | | | X | | X | X |
| 7TH | 1.00 | | | | X | X | | X |
| 7TH | 1.00 | | | | X | X | X | |
| 8TH | 0.82 | 1.21 | X | | | | X | X |
| 9TH | 0.70 | 1.18 | X | | | X | X | |
| 10TH | 0.65 | 1.07 | X | | X | | X | |

X = ON - ENGAGED CARRYING TORQUE

FIG. 7

MULTI-SPEED TRANSMISSION

CROSS-REFERENCE TO RELATED APPLICATIONS

This application claims priority to U.S. Provisional Application No. 61/968,142, filed on Mar. 20, 2014, which is hereby incorporated in its entirety herein by reference.

FIELD

The invention relates generally to a multiple speed transmission, and more particularly, to a transmission having a plurality speeds, four planetary gear sets, two of which may be combined into a single planetary gear set assembly, and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, a planetary gear set assembly, two planetary gear sets, a plurality of interconnecting members and six torque transmitting devices. The torque transmitting devices may be, for example, clutches and brakes.

In an embodiment of the present invention, the planetary gear set assembly has a first member, a second member, a third member and a fourth member.

In another embodiment of the present invention, the first planetary gear set has a first, a second and a third member.

In another embodiment of the present invention, the first interconnecting member continuously interconnects the third member of the planetary gear set assembly with the second member of the first planetary gear set.

In another embodiment of the present invention, the second planetary gear set having a first, a second and a third member.

In another embodiment of the present invention, the second interconnecting member continuously interconnects the first member of the first planetary gear set with the first member of the second planetary gear set.

In another embodiment of the present invention, the six torque transmitting mechanisms are selectively engageable to interconnect at least one of the members of the planetary gear set assembly, one of the members of the first and second planetary gear sets with at least one other of the members of the planetary gear set assembly, one other of the members of the first and second planetary gear sets, the input member, the output member and the stationary member.

In another embodiment of the present invention, the first of the six torque transmitting mechanisms is selectively engageable to interconnect the first member of the planetary gear set assembly with the first member of the first planetary gear set and the first member of the second planetary gear set.

In another embodiment of the present invention, the second of the six torque transmitting mechanisms is selectively engageable to interconnect the second member of the planetary gear set assembly with the first member of the first planetary gear set and the first member of the second planetary gear set.

In another embodiment of the present invention, the third of the six torque transmitting mechanisms is selectively engageable to interconnect the third member of the first planetary gear set with the second member of the second planetary gear set and the output member.

In another embodiment of the present invention, the fourth of the six torque transmitting mechanisms is selectively engageable to interconnect the second member of the planetary gear set assembly with the third member of the second planetary gear set.

In another embodiment of the present invention, the fifth of the six torque transmitting mechanisms is selectively engageable to interconnect the fourth member of the planetary gear set assembly with the stationary member.

In another embodiment of the present invention, the sixth of the six torque transmitting mechanisms is selectively engageable to interconnect the third member of the second planetary gear set with the stationary member.

In another embodiment of the present invention, the first members of the first and second planetary gear sets are sun gears, the fourth member of the planetary gear set assembly is a sun gear, the second members of the first and second planetary gear sets are carrier members, the second member of the planetary gear set assembly is a carrier member, the third member of the planetary gear set assembly is a ring gear, the third members of the first and second planetary gear sets are ring gears and the first member of the planetary gear set assembly is a common gear.

In another embodiment of the present invention, the common gear is formed as a unitary gear having an outer surface and an inner surface, wherein the outer surface has a plurality of gear teeth and the inner surface has a plurality of gear teeth.

In another embodiment of the present invention, the unitary gear meshes with a first plurality of pinion gears rotatably supported by the carrier member of the planetary gear set assembly and a second plurality of pinion gears rotatably supported by the carrier member of the planetary gear set assembly.

In another embodiment of the present invention, the torque transmitting mechanisms are selectively engageable in combinations of at least three to establish a plurality of forward speed ratios and at least one reverse speed ratio between the input member and the output member.

In yet another embodiment of the present invention, a transmission has an input member, an output member, a planetary gear set assembly has a first sun gear, a second sun gear, a carrier member and a ring gear. The carrier member rotatably supports a first plurality of pinions and a second plurality of pinions. The first plurality of pinions intermesh with the first sun gear and the second plurality of pinions and the second plurality of pinions intermesh with the first plurality of pinions and the second sun gear. A first planetary gear set has a sun gear, a carrier member and a ring gear. A second planetary gear set having a sun gear, a carrier member and a ring gear. A first interconnecting member continuously interconnects the carrier member of the planetary gear set assembly with the input member and the carrier member of the first planetary gear set. A second interconnecting member continuously interconnects the sun gear of the first planetary gear set with sun gear of the second planetary gear set. Six torque transmitting mechanisms are selectively engageable to interconnect at least one of the members of the planetary gear set assembly, at least one of the members of the first and second planetary gear sets with at least one other of the members of the planetary gear set assembly, at least one other of the members of the first and second planetary gear sets, the input member, the output member and a stationary member. The torque transmitting mechanisms are selectively engageable in combinations of at least three to establish a plurality of forward speed ratios and at least one reverse speed ratio between the input member and the output member.

In yet another embodiment of the present invention, a transmission includes an input shaft, an output shaft, a planetary gear set assembly having a first sun gear, a second sun gear, a ring gear and a carrier member. The carrier member supports a first set of pinion gears and a second set of pinion gears. The second set of pinion gears are stepped pinion gears having a larger diameter portion and a smaller diameter portion. The first set of pinion gears intermesh with the first sun gear and the smaller diameter portion of the second set of pinion gears intermesh with the first set of pinion gears and the ring gear and the larger diameter portion of the second set of pinion gears intermesh with the second sun gear. A first planetary gear set has a sun gear, a ring gear and a carrier member. A second planetary gear set has a sun gear, a ring gear and a carrier member. A first interconnecting member continuously interconnects the carrier member of the planetary gear set assembly with the carrier member of the first planetary gear set and the input shaft. A second interconnecting member continuously interconnects the sun gear of the first planetary gear set with the sun gear of the second planetary gear set. A first torque transmitting mechanism is selectively engageable to interconnect the second sun gear of the planetary gear set assembly with the stationary member. A second torque transmitting mechanism is selectively engageable to interconnect the ring gear of the second planetary gear set with the stationary member. A third torque transmitting mechanism is selectively engageable to interconnect the first sun gear of the planetary gear set assembly with the sun gear of the first and the sun gear of the second planetary gear sets. A fourth torque transmitting mechanism is selectively engageable to interconnect the ring gear of the planetary gear set assembly with the sun gear of the first and the sun gear of the second planetary gear sets. A fifth torque transmitting mechanism is selectively engageable to interconnect the ring gear of the first planetary gear set with the carrier member of the second planetary gear set and the output member. A sixth torque transmitting mechanism is selectively engageable to interconnect the ring gear of the planetary gear set assembly with the ring gear of the second planetary gear set. The torque transmitting mechanisms are selectively engageable in combinations of at least three to establish a plurality of forward speed ratios and at least one reverse speed ratio between the input member and the output member.

In yet another embodiment of the present invention, a transmission has an input shaft, an output shaft, a planetary gear set assembly having a first sun gear, a second sun gear, a ring gear and a carrier member. The carrier member supports a first set of pinion gears and a second set of pinion gears. The first set of pinion gears intermesh with the first sun gear and the second set of pinion gears and the second set of pinion gears intermesh with the first set of pinion gears, the ring gear and the second sun gear. A first planetary gear set has a sun gear, a ring gear and a carrier member. A second planetary gear set having a sun gear, a ring gear and a carrier member. A first interconnecting member continuously interconnects the carrier member of the planetary gear set assembly with the carrier member of the first planetary gear set and the input shaft. A second interconnecting member continuously interconnects the sun gear of the first planetary gear set with the sun gear of the second planetary gear set. A first torque transmitting mechanism is selectively engageable to interconnect the second sun gear of the planetary gear set assembly with the stationary member. A second torque transmitting mechanism is selectively engageable to interconnect the ring gear of the second planetary gear set with the stationary member. A third torque transmitting mechanism is selectively engageable to interconnect the first sun gear of the planetary gear set assembly with the sun gear of the first and the sun gear of the second planetary gear sets. A fourth torque transmitting mechanism is selectively engageable to interconnect the ring gear of the planetary gear set assembly with the sun gear of the first and the sun gear of the second planetary gear sets. A fifth torque transmitting mechanism is selectively engageable to interconnect the ring gear of the first planetary gear set with the carrier member of the second planetary gear set and the output member. A sixth torque transmitting mechanism is selectively engageable to interconnect the ring gear of the planetary gear set assembly with the ring gear of the second planetary gear set. The torque transmitting mechanisms are selectively engageable in combinations of at least three to establish a plurality of forward speed ratios and at least one reverse speed ratio between the input member and the output member.

In yet another embodiment of the present invention, a transmission includes an input shaft, an output shaft, a first planetary gear set has a sun gear, a ring gear and a carrier member, a second planetary gear set has a sun gear, a ring gear and a carrier member, a third planetary gear set has a sun gear, a ring gear and a carrier member, a fourth planetary gear set has a sun gear, a ring gear and a carrier member. A first interconnecting member continuously interconnects the carrier member of the first planetary gear set with the carrier member of the third planetary gear set and the input shaft. A second interconnecting member continuously interconnects the sun gear of the first planetary gear set with the sun gear of the second planetary gear set. A third interconnecting member continuously interconnects the carrier member of the third planetary gear set with the ring gear of the fourth planetary gear set. A fourth interconnecting member continuously interconnects the ring gear of the third planetary gear set with the carrier member of the fourth planetary gear set. A first torque transmitting mechanism is selectively engageable to interconnect the sun gear of the third planetary gear set with the stationary member. A second torque transmitting mechanism is selectively engageable to interconnect the ring gear of the second planetary gear set with the stationary member. A third torque transmitting mechanism is selectively engageable to interconnect the sun gear of the fourth planetary gear set with the sun gear of the first and the sun gear of the second planetary gear sets. A fourth torque transmitting mechanism is selectively engageable to interconnect the carrier member of the fourth planetary gear set with the sun gear of the first and the sun gear of the second planetary gear sets. A fifth torque transmitting mechanism is selectively engageable to interconnect the ring gear of the first planetary gear set with the carrier member of the second planetary gear set and the output member. A sixth torque transmitting mechanism is selectively engageable to interconnect the carrier member of the fourth planetary gear set with the ring gear of the second planetary gear set. The torque transmitting mechanisms are selectively engageable in combinations of at least three to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
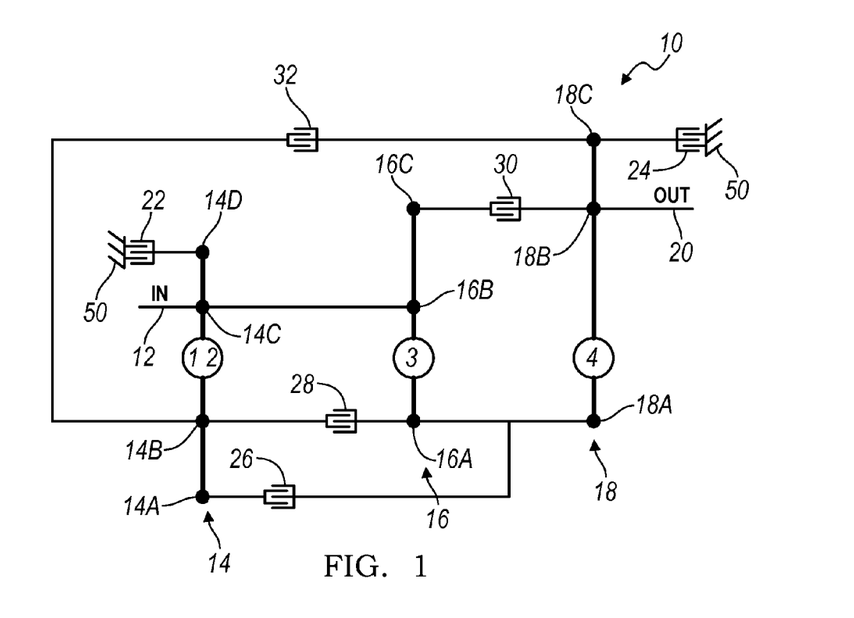
FIG. 1 is a lever diagram of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a planetary gear set assembly 14, a first planetary gear set 16, and a second planetary gear set 18, and an output shaft or member 20. In the lever diagram of FIG. 1, the planetary gear set assembly 14 has four nodes: a first node 14A, a second node 14B, a third node 14C, and a fourth node 14D. The first planetary gear set 16 has three nodes: a first node 16A, a second node 16B and a third node 16C. The second planetary gear set 18 has three nodes: a first node 18A, a second node 18B and a third node 18C. The input member 12 is continuously coupled to the third node 14C of the planetary gear set assembly 14. The output member 20 is continuously coupled to the second node 18B of the second planetary gear set 18.

The third node 14C of the planetary gear set assembly 14 is coupled to the second node 16B of the first planetary gear set 16. The first node 16A of the first planetary gear set 16 is coupled the first node 18A of the second planetary gear set 18.

A first clutch 22 selectively connects the fourth node 14D of the planetary gear set assembly 14 with a stationary member 50. A second clutch 24 selectively connects the third node 18C of the second planetary gear set 18 with the stationary member 50. A third clutch 26 selectively connects the first node 14A of the planetary gear set assembly 14 with the first node 16A of the first planetary gear set 16 and the first node 18A of the second planetary gear set 18. A fourth clutch 28 selectively connects the second node 14B of the planetary gear set assembly 14 with the first node 16A of the first planetary gear set 16 and the first node 18A of the second planetary gear set 18. A fifth clutch 30 selectively connects the third node 16C of the first planetary gear set 16 with the second node 18B of the second planetary gear set 18. A sixth clutch 32 selectively connects the second node 14B of the planetary gear set assembly 14 with the third node 18C of the second planetary gear set 18.

Figure 2:
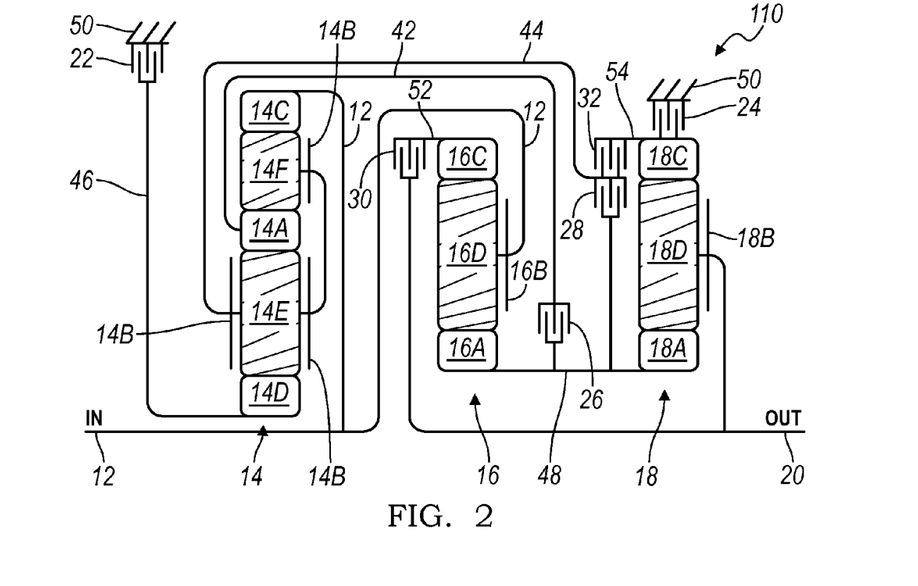
FIG. 2 is a diagrammatic illustration of an embodiment of the transmission of FIG. 1 according to the principles of the present invention.

Referring now to FIG. 2, a stick diagram presents a schematic layout of an embodiment of a multi-speed transmission 110 according to one form of the present invention. In FIG. 2, the numbering from the lever diagram of FIG. 1 is carried over. The clutches and couplings are correspondingly presented whereas the nodes of the planetary gear sets or gear set assembly now appear as components of planetary gear sets or planetary gear set assemblies such as sun gears, ring gears, planet gears and planet gear carriers.

For example, in transmission 110 of the present embodiment, the planetary gear set assembly 14 is configured as a stacked planetary gear set. The planetary gear set assembly 14 includes sun-ring common gear member 14A, a planet gear carrier 14B, a ring gear member 14C and a sun gear member 14D. The sun-ring common gear member 14A is a combination gear that has gear teeth on an inner surface and gear teeth on an outer surface. Thus, sun-ring common gear member 14A is configured to act as a ring gear and a sun gear. The sun-ring common gear member 14A is connected for common rotation with a first shaft or interconnecting member 42. The planet gear carrier 14B rotatably supports a first set of planet pinion gears 14E (only one of which is shown) and a second set of planet pinion gears 14F (only one of which is shown). The planet gear carrier 14B is connected for common rotation with a second shaft or interconnecting member 44. The ring gear member 14C is connected for common rotation with the input shaft or member 12. The sun gear member 14D is connected for common rotation with a third shaft or interconnecting member 46. The first set of planet pinion gears 14E are each configured to intermesh with both the sun gear member 14D and the inner surface of the sun-ring common gear member 14A. The second set of planet pinion gears 14F are each configured to intermesh with both the ring gear member 14C and the outer surface of the sun-ring common gear member 14A.

The first planetary gear set 16 includes a sun gear member 16A, a planet gear carrier member 16B, and a ring gear member 16C. The sun gear member 16A is connected for common rotation with a fourth shaft or interconnecting member 48. The planet gear carrier member 16B rotatably supports a set of pinion gears 16D (only one of which is shown). The planet gear carrier member 16B is connected for common rotation with the input shaft or member 12. The set of planet pinion gears 16D are each configured to intermesh with both the sun gear member 16A and the ring gear member 16C. The ring gear member 16C is connected for common rotation with a fifth shaft or interconnecting member 52.

A second planetary gear set assembly 18 includes a sun gear member 18A, a planet gear carrier member 18B, and a ring gear member 18C. The sun gear member 18A is connected for common rotation with the fourth shaft or interconnecting member 48. The planet carrier member 18B is connected for common rotation with the output shaft or member 20. Planet carrier member 18B rotatably supports a set of planet pinion gears 18D (only one of which is shown). The planet pinion gears 18D are each configured to intermesh with both the sun gear member 18A and the ring gear member 18C. The ring gear member 18C is connected for common rotation with the sixth shaft or member 54.

The input shaft or member 12 is continuously connected to an input source, such as an engine (not shown) or a turbine of a torque converter (not shown). The output shaft or member 20 is continuously connected with another output such as the final drive unit or transfer case (not shown).

The torque-transmitting mechanisms, including a first and second brake 22, 24 and a first, second, third, and fourth clutches 26, 28, 30, 32 allow for selective interconnection of the shafts or interconnecting members 42, 44, 46, 48, 52, 54 to other shafts or interconnecting members, the members of the planetary gear sets assemblies 14, 16, 18, or the stationary member or transmission housing 50.

For example, the first brake 22 is selectively engageable to connect the third shaft or interconnecting member 46 to the transmission housing 50 in order to restrict the sun gear 14D from rotating relative to the transmission housing 50. The second brake 24 is selectively engageable to connect the ring gear member 18C and the sixth shaft or interconnecting member 54 to the transmission housing 50 in order to restrict the ring gear member 18C and shaft 54 from rotating relative to the transmission housing 50. The first clutch 26 is selectively engageable to connect the first shaft or interconnecting member 42 with the fourth shaft or interconnecting member 48. The second clutch 28 is selectively engageable to connect the second shaft or interconnecting member 44 with the fourth shaft or interconnecting member 48. The third clutch 30 is selectively engageable to connect the output member 20 with the fifth shaft or interconnecting member 52. The fourth clutch 32 is selectively engageable to connect the second shaft or interconnecting member 44 with the sixth shaft or interconnecting member 54.

Figure 3:
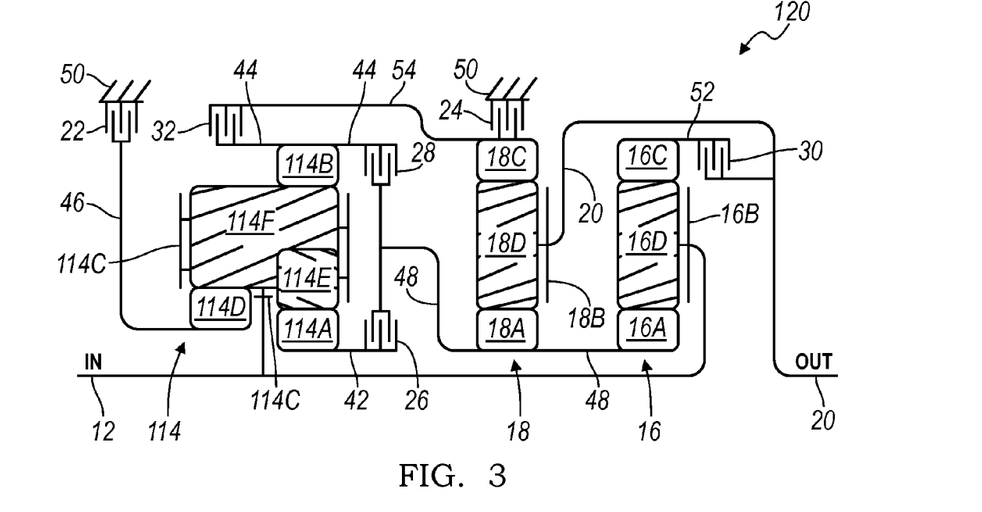
FIG. 3 is a diagrammatic illustration of another embodiment of the transmission of FIG. 1 according to the principles of the present invention.

Referring now to FIG. 3, a stick diagram presents a schematic layout of another embodiment of the multi-speed transmission 120 according to another form of the present invention. In FIG. 3, the numbering from the diagrams of FIGS. 1 and 2 are carried over. The clutches and couplings are correspondingly presented while the nodes of the gear set assemblies 14, 16, and 18 may now correspond to different components of planetary gear sets from those illustrated in FIG. 2.

For example, the planetary gear set assembly 14 is now a ravigneaux gear set assembly 114 that includes a first sun gear member 114A and a second sun gear member 114D, a ring gear member 114B, and a planet gear carrier 114C. The first sun gear member 114A is connected for common rotation with the first shaft or interconnecting member 42. The second sun gear member 114D is connected for common rotation with the third shaft or interconnecting member 46. The ring gear member 114B is connected for common rotation with the second shaft or interconnecting member 44. The planet gear carrier 114C rotatably supports a first and a second set of pinion gears 114E, 114F (only one of each set is shown). The first planet pinion gears 114E are short pinions that are in mesh with first sun gear 114A and the second set of planet pinion gears 114F. The second planet pinion gears 114F are long pinions that are in mesh with second sun gear 114D, the ring gear 114B and the first set of planet pinion gears 114E. The planet gear carrier member 114C is connected for common rotation with the input shaft or member 12.

The first planetary gear set 16, as in the embodiment of FIG. 2, includes a sun gear member 16A, a planet gear carrier member 16B, and a ring gear member 16C. The sun gear member 16A is connected for common rotation with a fourth shaft or interconnecting member 48. The planet gear carrier member 16B rotatably supports a set of pinion gears 16D (only one of which is shown). The planet gear carrier member 16B is connected for common rotation with the input shaft or member 12. The set of planet pinion gears 16D are each configured to intermesh with both the sun gear member 16A and the ring gear member 16C. The ring gear member 16C is connected for common rotation with a fifth shaft or interconnecting member 52.

A second planetary gear set 18 includes a sun gear member 18A, a planet gear carrier member 18B, and a ring gear member 18C. The sun gear member 18A is connected for common rotation with the fourth shaft or interconnecting member 48. The planet carrier member 18B is connected for common rotation with the output shaft or member 20. Planet carrier member 18B rotatably supports a set of planet pinion gears 18D (only one of which is shown). The planet pinion gears 18D are each configured to intermesh with both the sun gear member 18A and the ring gear member 18C. The ring gear member 18C is connected for common rotation with the sixth shaft or member 54.

The torque-transmitting mechanisms, including a first and second brake 22, 24 and a first, second, third, and fourth clutches 26, 28, 30, 32 allow for selective interconnection of the shafts or interconnecting members 42, 44, 46, 48, 52, 54 to other shafts or interconnecting members, the members of the planetary gear sets 14, 16, 18, or the stationary member or transmission housing 50. For example, the first brake 22 is selectively engageable to connect the third shaft or interconnecting member 46 to the transmission housing 50 in order to restrict the sun gear 114D from rotating relative to the transmission housing 50. The second brake 24 is selectively engageable to connect the ring gear member 18C and the sixth shaft or interconnecting member 54 to the transmission housing 50 in order to restrict the ring gear member 18C and shaft 54 from rotating relative to the transmission housing 50. The first clutch 26 is selectively engageable to connect the first shaft or interconnecting member 42 with the fourth shaft or interconnecting member 48. The second clutch 28 is selectively engageable to connect the second shaft or interconnecting member 44 with the fourth shaft or interconnecting member 48. The third clutch 30 is selectively engageable to connect the output member 20 with the fifth shaft or interconnecting member 52. The fourth clutch 32 is selectively engageable to connect the second shaft or interconnecting member 44 with the sixth shaft or interconnecting member 54.

Figure 4:
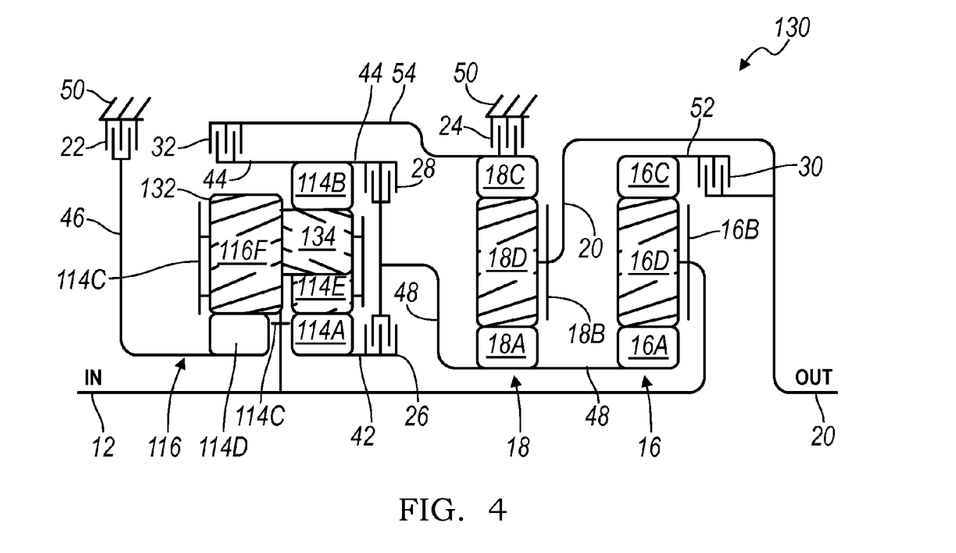
FIG. 4 is a diagrammatic illustration of yet another embodiment of the transmission of FIG. 1 according to the principles of the present invention.

Referring now to FIG. 4, a stick diagram presents a schematic layout of another embodiment of a multi-speed transmission 130 according to the principles of the present invention. In FIG. 4, the numbering from the diagrams of FIGS. 1 and 3 are carried over. However, in the transmission 130, the planet gears or pinions 114F of FIG. 3 are configured as stepped pinion gears 116F having a larger diameter portion 132 and a small diameter portion 134. The large diameter portions 132 of each of the stepped planet gears 116F are intermeshed with the second sun gear member 114D. The small diameter portions 134 of each of the stepped planet gears 116F are intermeshed with both the ring gear member 114B and the planet gears 114E. The planet gears 114E are each intermeshed with both the stepped planet gears 116F and the first sun gear member 114A.

Figure 5:
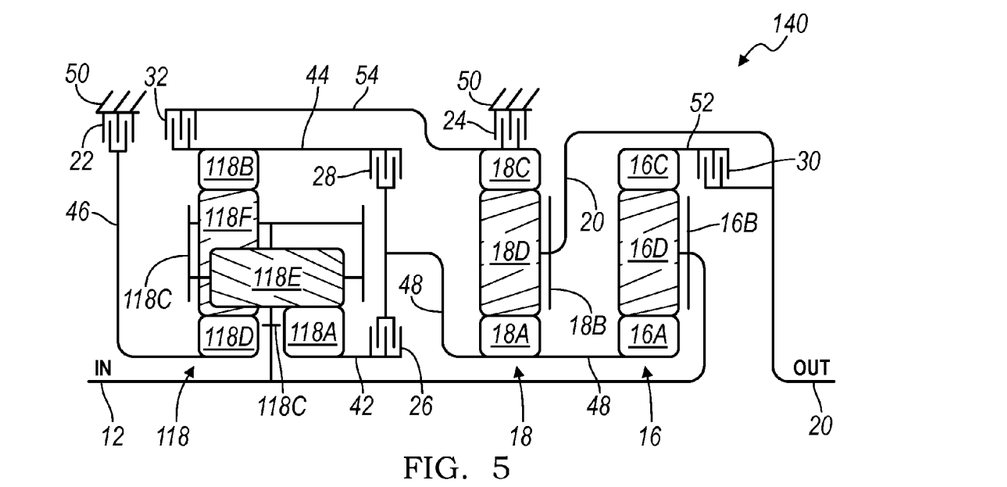
FIG. 5 is a diagrammatic illustration of still another embodiment of the transmission of FIG. 1 according to the principles of the present invention.

Referring now to FIG. 5, a stick diagram presents a schematic layout of another embodiment of a multi-speed transmission 140 according to the principles of the present invention. In FIG. 5, the numbering from the diagrams of FIGS. 1 and 3 are carried over. However, in the transmission 140, the short planet or pinion gears 114E are configured as long planet or pinion gears 118E and the long planet or pinion gears 114F are configured as short planet or pinion gears 118F. The long planet gears 118E are each intermeshed with both the sun gear member 118A and the short planet gears 118F. The short planet gears 118F are each intermeshed with the long planet gears 118E, ring gear 118B and the sun gear member 118D.

Figure 6:
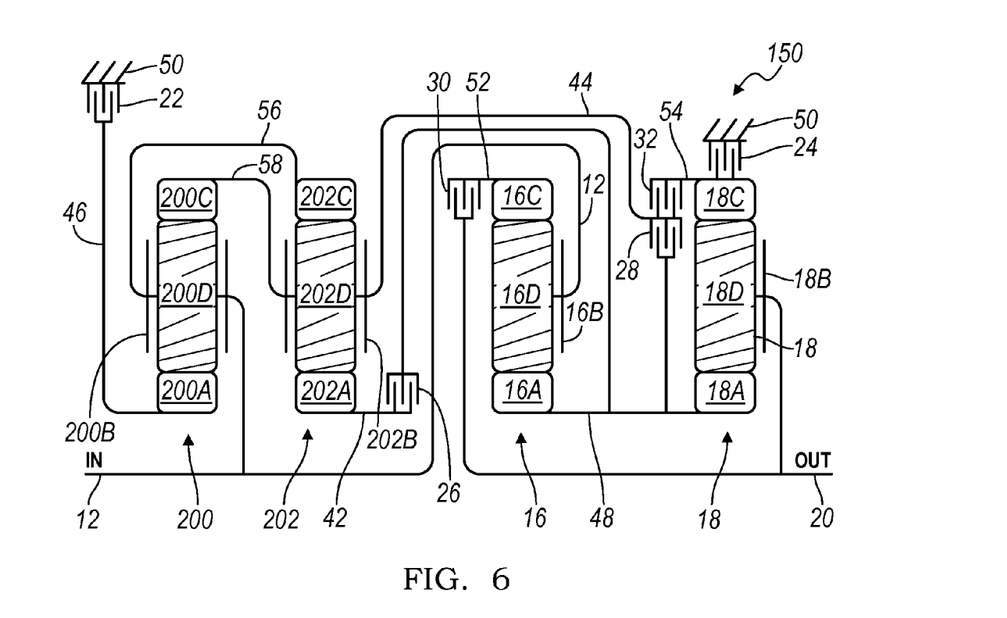
FIG. 6 is a diagrammatic illustration of yet another embodiment of the transmission of FIG. 1 according to the principles of the present invention.

Referring now to FIG. 6, a stick diagram presents a schematic layout of an embodiment of a multi-speed transmission 150 according to the principles of the present invention. In FIG. 6, the numbering from the lever diagram of FIG. 1 is carried over. The clutches and couplings are correspondingly presented whereas the nodes of the gear set assemblies now appear as components of planetary gear sets such as sun gears, ring gears, planet gears and planet gear carriers.

For example, the planetary gear set assembly 14 is configured as two separate planetary gear sets including a first planetary gear set 200 and a second planetary gear set 202. Therefore, some of the nodes of the planetary gear set assembly 14 correspond to multiple components of both the first and second planetary gear sets 200, 202. For example, the first planetary gear set 200 includes a sun gear member 200A, a planet gear carrier member 200B, and a ring gear member 200C. The carrier member 200B rotatably supports a set of planet or pinion gears 200D (only one of which is shown). Each of the planet gears 200D are intermeshed with both the sun gear member 200A and the ring gear member 200C. The second planetary gear set 202 includes a sun gear member 202A, a planet gear carrier member 202B, and a ring gear member 202C. The carrier member 202B rotatably supports a set of planet or pinion gears 202D (only one of which is shown). Each of the planet gears 202D are intermeshed with both the sun gear member 202A and the ring gear member 202C. Therefore, the first node 14A of the planetary gear set assembly 14 of the lever diagram of FIG. 1 corresponds to the sun gear member 202A. The second node 14B of the planetary gear set assembly 14 corresponds to the ring gear 200C and the carrier member 202B. The third node 14C of the first gear set assembly corresponds to the carrier member 200B and the ring gear member 202C. The fourth node 14D of the planetary gear set assembly 14 corresponds to the sun gear member 200A.

The sun gear member 200A is connected for common rotation with third shaft or interconnecting member 46. The planet gear carrier 200B is connected for common rotation with a seventh shaft or interconnecting member 56 and the input shaft or member 12. The ring gear member 200C is connected for common rotation with an eighth shaft or interconnecting member 58.

The sun gear member 202A is connected for common rotation with first shaft or interconnecting member 42. The carrier member 202B is connected for common rotation with the second shaft or interconnecting member 44 and the eighth shaft or interconnecting member 58. The ring gear member 202C is connected for common rotation with the seventh shaft or interconnecting member 56.

The second gear set assembly 16 includes a sun gear member 16A, a planet gear carrier member 16B, and a ring gear member 16C. The planet gear carrier member 16B rotatably supports a set of planet or pinion gears 16D (only one of which is shown). The planet gears 16D are each configured to intermesh with both the sun gear member 16A and the ring gear member 16C. The sun gear member 16A is connected for common rotation with a fourth shaft or interconnecting member 48. The carrier member 16B is connected for common rotation with the input shaft or member 12. The ring gear member 16C is connected for common rotation with the fifth shaft or interconnecting member 52.

The third gear set assembly 18 includes a sun gear member 18A, a planet gear carrier member 18B, and a ring gear member 18C. The planet gear carrier member 18B rotatably supports a set of planet or pinion gears 18D (only one of which is shown). The planet gears 18D are each configured to intermesh with both the sun gear member 18A and the ring gear member 18C. The sun gear member 18A is connected for common rotation with the fourth shaft or interconnecting member 48. The carrier member 18B is connected for common rotation with the output shaft or member 20. The ring gear member 18C is connected for common rotation with a sixth shaft or interconnecting member 54 and with brake 24.

The input shaft or member 12 is continuously connected to an input source, such as an engine (not shown) or a turbine of a torque converter (not shown). The output shaft or member 20 is continuously connected with a motor vehicle output such as a final drive unit or transfer case (not shown).

The torque-transmitting mechanisms, including the first, second, third, and fourth clutches 22, 24, 26, 28 and first and second brakes 30, 32 allow for selective interconnection of the shafts or interconnecting members 42, 44, 46, 48, 52, 54, 56, 58 to other shafts or interconnecting members 42, 44, 46, 48, 52, 54, 56, 58, the members of the gear set assemblies 14, 16, 18, or the stationary member or transmission housing 50. For example, the first brake 22 is selectively engageable to connect the third interconnecting member 46 to the stationary member or transmission housing 50 in order to restrict the sun gear member 200A from rotating relative to the housing 50. The second brake 24 is selectively engageable to connect the sixth interconnecting member 54 and the ring gear 18C to the stationary member or transmission housing 50 in order to restrict rotation of the ring gear member 18C and sixth interconnecting member 54. The first clutch 26 is selectively engageable to connect the first interconnecting member 42 with the fourth interconnecting member 48. The second clutch 28 is selectively engageable to connect the second interconnecting member 44 with the fourth interconnecting member 48. The third clutch 30 is selectively engageable to connect the fifth interconnecting member 52 with the output member 20. The fourth clutch 32 is selectively engageable to connect the second interconnecting member 44 with the sixth interconnecting member 54.

Figure 7:
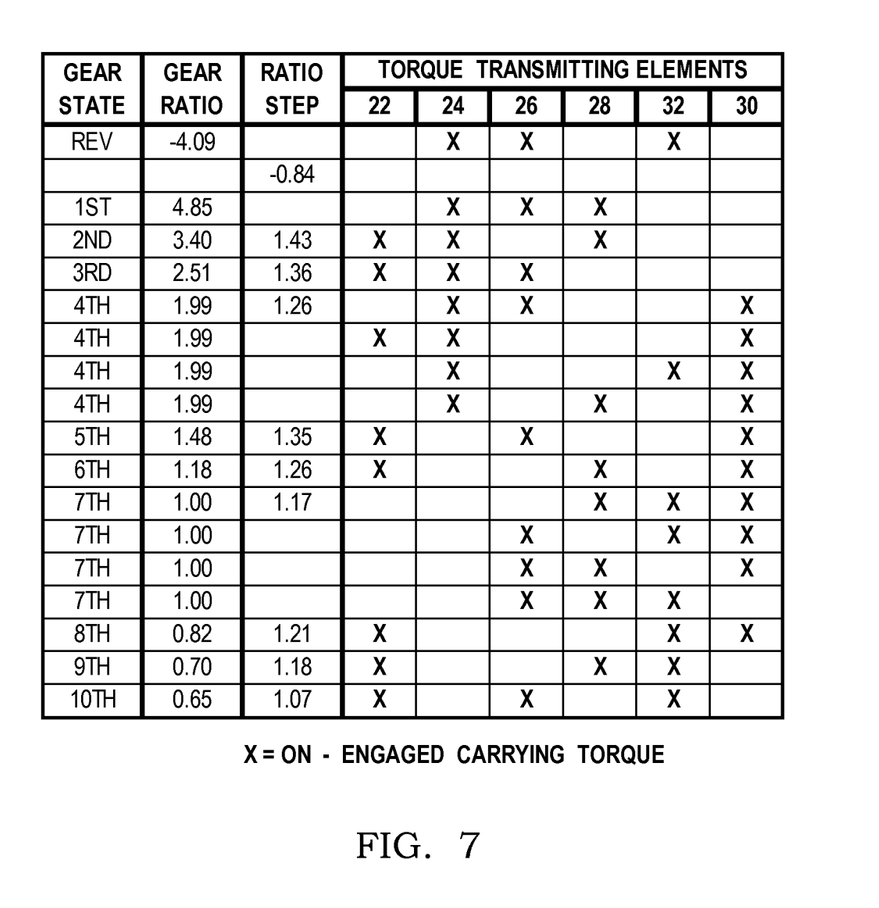
FIG. 7 is a truth table presenting an example of a state of engagement of various torque transmitting elements to produce multiple forward and at least one reverse speed or gear ratios of the transmissions illustrated in FIGS. 2-6.

Referring now to FIG. 7 and with continued reference to FIGS. 1-6, the operation of the multi-speed transmissions 10, 110, 120, 130, 140, 150 and 160 will be described. It will be appreciated that transmissions are capable of transmitting torque from the input shaft or member 12 to the output shaft or member 20 in multiple forward speed torque ratios and at least one reverse speed or torque ratio. Each forward and reverse speed or torque ratio is attained by engagement of one or more of the torque-transmitting mechanisms (i.e. first brake 22, second brake 24, first clutch 26, second clutch 28, third clutch 30, and fourth clutch 32), as will be explained below.

FIG. 7 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmissions. Of course, other gear ratios are achievable depending on the gear diameter, gear teeth count and gear configuration selected.

For example, a reverse gear is established by engaging or activating the second brake 24, the first clutch 26, and the fourth clutch 32. Likewise, the ten forward speed or gear ratios are achieved through different combinations of clutch and brake engagement, as shown in FIG. 7, by way of example. FIG. 7 also illustrates multiple clutch and brake engagement options for achieving fourth gear and seventh gear.

It should be appreciated that the shafts or interconnecting members 12, 20, 42, 44, 46, 48, 50, 54, 56, 58, 60 and 62 may each be single unitary members or each may be comprised of multiple interconnected rotatable members without departing from the scope of the present invention.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
a planetary gear set assembly having a first member, a second member, a third member and a fourth member;
a first planetary gear set having a first, a second and a third member;
a first interconnecting member continuously interconnecting the third member of the planetary gear set assembly with the second member of the first planetary gear set;
a second planetary gear set having a first, a second and a third member;
a second interconnecting member continuously interconnecting the first member of the first planetary gear set with the first member of the second planetary gear set; and
six torque transmitting mechanisms selectively engageable to interconnect at least one of the members of the planetary gear set assembly, one of the members of the first and second planetary gear sets with at least one other of the members of the planetary gear set assembly, one other of the members of the first and second planetary gear sets, the input member, the output member and a stationary member, and
wherein the torque transmitting mechanisms are selectively engageable in combinations of at least three to establish a plurality of forward speed ratios and at least one reverse speed ratio between the input member and the output member;
wherein the first members of the first and second planetary gear sets are sun gears, the fourth member of the planetary gear set assembly is a sun gear, the second members of the first and second planetary gear sets are carrier members, the second member of the planetary gear set assembly is a carrier member, the third member of the planetary gear set assembly is a ring gear, the third members of the first and second planetary gear sets are ring gears and the first member of the planetary gear set assembly is a common gear.

2. The transmission of claim 1
wherein a first of the six torque transmitting mechanisms is selectively engageable to interconnect the first member of the planetary gear set assembly with the first member of the first planetary gear set and the first member of the second planetary gear set.

3. The transmission of claim 2 wherein a second of the six torque transmitting mechanisms is selectively engageable to interconnect the second member of the planetary gear set assembly with the first member of the first planetary gear set and the first member of the second planetary gear set.

4. The transmission of claim 3 wherein a third of the six torque transmitting mechanisms is selectively engageable to interconnect the third member of the first planetary gear set with the second member of the second planetary gear set and the output member.

5. The transmission of claim 4 wherein a fourth of the six torque transmitting mechanisms is selectively engageable to interconnect the second member of the planetary gear set assembly with the third member of the second planetary gear set.

6. The transmission of claim 5 wherein a fifth of the six torque transmitting mechanisms is selectively engageable to interconnect the fourth member of the planetary gear set assembly with the stationary member.

7. The transmission of claim 6 wherein a sixth of the six torque transmitting mechanisms is selectively engageable to interconnect the third member of the second planetary gear set with the stationary member.

8. The transmission of claim 1 wherein the common gear is formed as a unitary gear having an outer surface and an inner surface, wherein the outer surface has a plurality of gear teeth and the inner surface has a plurality of gear teeth.

9. The transmission of claim 8 wherein the unitary gear meshes with a first plurality of pinion gears rotatably supported by the carrier member of the planetary gear set assembly and a second plurality of pinion gears rotatably supported by the carrier member of the planetary gear set assembly.

10. A transmission comprising:
an input member;
an output member;
a planetary gear set assembly having a first sun gear, a second sun gear, a carrier member and a ring gear, wherein the carrier member rotatably supports a first plurality of pinions and a second plurality of pinions and wherein the first plurality of pinions intermesh with the first sun gear and the second plurality of pinions and the second plurality of pinions intermesh with the first plurality of pinions and the second sun gear;
a first planetary gear set having a sun gear, a carrier member and a ring gear;
a second planetary gear set having a sun gear, a carrier member and a ring gear;
a first interconnecting member continuously interconnecting the carrier member of the planetary gear set assembly with the input member and the carrier member of the first planetary gear set;
a second interconnecting member continuously interconnecting the sun gear of the first planetary gear set with sun gear of the second planetary gear set; and
six torque transmitting mechanisms selectively engageable to interconnect at least one of the members of the planetary gear set assembly, at least one of the members of the first and second planetary gear sets with at least one other of the members of the planetary gear set assembly, at least one other of the members of the first and second planetary gear sets, the input member, the output member and a stationary member, and
wherein the torque transmitting mechanisms are selectively engageable in combinations of at least three to establish a plurality of forward speed ratios and at least one reverse speed ratio between the input member and the output member.

11. The transmission of claim 10 wherein a first of the six torque transmitting mechanisms is selectively engageable to interconnect the second sun gear of the planetary gear set assembly with the stationary member.

12. The transmission of claim 11 wherein a second of the six torque transmitting mechanisms is selectively engageable to interconnect the ring gear of the second planetary gear set with the stationary member.

13. The transmission of claim 12 wherein a third of the six torque transmitting mechanisms is selectively engageable to interconnect the first sun gear of the planetary gear set assembly with the sun gear of the first and the sun gear of the second planetary gear sets.

14. The transmission of claim 13 wherein a fourth of the six torque transmitting mechanisms is selectively engageable to interconnect the ring gear of the planetary gear set assembly with the sun gear of the first and the sun gear of the second planetary gear sets.

15. The transmission of claim 14 wherein a fifth of the six torque transmitting mechanisms is selectively engageable to interconnect the ring gear of the first planetary gear set with the carrier member of the second planetary gear set and the output member.

16. The transmission of claim 15 wherein a sixth of the six torque transmitting mechanisms is selectively engageable to interconnect the ring gear of the planetary gear set assembly with the ring gear of the second planetary gear set.

17. A transmission comprising:
an input shaft;
an output shaft;
a planetary gear set assembly having a first sun gear, a second sun gear, a ring gear and a carrier member, wherein the carrier member supports a first set of pinion gears and a second set of pinion gears, wherein the second set of pinion gears are stepped pinion gears having a larger diameter portion and a smaller diameter portion and wherein the first set of pinion gears intermesh with the first sun gear and the smaller diameter portion of the second set of pinion gears intermesh with the first set of pinion gears and the ring gear and the larger diameter portion of the second set of pinion gears intermesh with the second sun gear;
a first planetary gear set having a sun gear, a ring gear and a carrier member;
a second planetary gear set having a sun gear, a ring gear and a carrier member;
a first interconnecting member continuously interconnecting the carrier member of the planetary gear set assembly with the carrier member of the first planetary gear set and the input shaft;
a second interconnecting member continuously interconnecting the sun gear of the first planetary gear set with the sun gear of the second planetary gear set;
a first torque transmitting mechanism is selectively engageable to interconnect the second sun gear of the planetary gear set assembly with the stationary member;
a second torque transmitting mechanism is selectively engageable to interconnect the ring gear of the second planetary gear set with the stationary member;
a third torque transmitting mechanism is selectively engageable to interconnect the first sun gear of the planetary gear set assembly with the sun gear of the first and the sun gear of the second planetary gear sets;
a fourth torque transmitting mechanism is selectively engageable to interconnect the ring gear of the planetary gear set assembly with the sun gear of the first and the sun gear of the second planetary gear sets;
a fifth torque transmitting mechanism is selectively engageable to interconnect the ring gear of the first planetary gear set with the carrier member of the second planetary gear set and the output member;
a sixth torque transmitting mechanism is selectively engageable to interconnect the ring gear of the planetary gear set assembly with the ring gear of the second planetary gear set, and
wherein the torque transmitting mechanisms are selectively engageable in combinations of at least three to establish a plurality of forward speed ratios and at least one reverse speed ratio between the input member and the output member.

18. A transmission comprising:
an input shaft;
an output shaft;
a planetary gear set assembly having a first sun gear, a second sun gear, a ring gear and a carrier member, wherein the carrier member supports a first set of pinion gears and a second set of pinion gears, and wherein the first set of pinion gears intermesh with the first sun gear and the second set of pinion gears and the second set of pinion gears intermesh with the first set of pinion gears, the ring gear and the second sun gear;

a first planetary gear set having a sun gear, a ring gear and a carrier member;
a second planetary gear set having a sun gear, a ring gear and a carrier member;
a first interconnecting member continuously interconnecting the carrier member of the planetary gear set assembly with the carrier member of the first planetary gear set and the input shaft;
a second interconnecting member continuously interconnecting the sun gear of the first planetary gear set with the sun gear of the second planetary gear set;
a first torque transmitting mechanism is selectively engageable to interconnect the second sun gear of the planetary gear set assembly with the stationary member;
a second torque transmitting mechanism is selectively engageable to interconnect the ring gear of the second planetary gear set with the stationary member;
a third torque transmitting mechanism is selectively engageable to interconnect the first sun gear of the planetary gear set assembly with the sun gear of the first and the sun gear of the second planetary gear sets;
a fourth torque transmitting mechanism is selectively engageable to interconnect the ring gear of the planetary gear set assembly with the sun gear of the first and the sun gear of the second planetary gear sets;
a fifth torque transmitting mechanism is selectively engageable to interconnect the ring gear of the first planetary gear set with the carrier member of the second planetary gear set and the output member;
a sixth torque transmitting mechanism is selectively engageable to interconnect the ring gear of the planetary gear set assembly with the ring gear of the second planetary gear set, and
wherein the torque transmitting mechanisms are selectively engageable in combinations of at least three to establish a plurality of forward speed ratios and at least one reverse speed ratio between the input member and the output member.

19. A transmission comprising:
an input shaft;
an output shaft;
a first planetary gear set having a sun gear, a ring gear and a carrier member;
a second planetary gear set having a sun gear, a ring gear and a carrier member;
a third planetary gear set having a sun gear, a ring gear and a carrier member;
a fourth planetary gear set having a sun gear, a ring gear and a carrier member;
a first interconnecting member continuously interconnecting the carrier member of the first planetary gear set with the carrier member of the third planetary gear set and the input shaft;
a second interconnecting member continuously interconnecting the sun gear of the first planetary gear set with the sun gear of the second planetary gear set;
a third interconnecting member continuously interconnecting the carrier member of the third planetary gear set with the ring gear of the fourth planetary gear set;
a fourth interconnecting member continuously interconnecting the ring gear of the third planetary gear set with the carrier member of the fourth planetary gear set;
a first torque transmitting mechanism is selectively engageable to interconnect the sun gear of the third planetary gear set with the stationary member;
a second torque transmitting mechanism is selectively engageable to interconnect the ring gear of the second planetary gear set with the stationary member;
a third torque transmitting mechanism is selectively engageable to interconnect the sun gear of the fourth planetary gear set with the sun gear of the first and the sun gear of the second planetary gear sets;
a fourth torque transmitting mechanism is selectively engageable to interconnect the carrier member of the fourth planetary gear set with the sun gear of the first and the sun gear of the second planetary gear sets;
a fifth torque transmitting mechanism is selectively engageable to interconnect the ring gear of the first planetary gear set with the carrier member of the second planetary gear set and the output member;
a sixth torque transmitting mechanism is selectively engageable to interconnect the carrier member of the fourth planetary gear set with the ring gear of the second planetary gear set, and
wherein the torque transmitting mechanisms are selectively engageable in combinations of at least three to establish a plurality of forward speed ratios and at least one reverse speed ratio between the input member and the output member.

\* \* \* \* \*